US012787043B2

(12) United States Patent
Wei et al.

(10) Patent No.: US 12,787,043 B2
(45) Date of Patent: Nov. 3, 2026

(54) METHODS, COMMUNICATIONS DEVICES, INFRASTRUCTURE EQUIPMENT, AND WIRELESS TELECOMMUNICATIONS SYSTEMS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

(*) Notice: Subject to any disclaimer, the term of this patent is extended or adjusted under 35 U.S.C. 154(b) by 411 days.

(21) Appl. No.: 18/561,750

(22) PCT Filed: Mar. 30, 2022

(86) PCT No.: PCT/EP2022/058499
§ 371 (c)(1),
(2) Date: Nov. 17, 2023

(87) PCT Pub. No.: WO2022/253481
PCT Pub. Date: Dec. 8, 2022

(65) Prior Publication Data

US 2024/0267939 A1 Aug. 8, 2024

(30) Foreign Application Priority Data

Jun. 1, 2021 (EP) .................................... 21177266

(51) Int. Cl.
*H04W 72/40* (2023.01)
*H04L 5/00* (2006.01)
(Continued)

(52) U.S. Cl.
CPC ........... *H04W 72/40* (2023.01); *H04L 5/0048* (2013.01); *H04W 64/006* (2013.01); *H04W 88/04* (2013.01)

(58) Field of Classification Search
None
See application file for complete search history.

(56) References Cited

U.S. PATENT DOCUMENTS

2016/0066157 A1* 3/2016 Noorshams ............ H04W 4/80 455/457
2020/0067610 A1* 2/2020 Lee ..................... H04B 7/0689
(Continued)

OTHER PUBLICATIONS

International Search Report and Written Opinion mailed on Jul. 13, 2022, received for PCT Application PCT/EP2022/058499, filed on Mar. 30, 2022, 8 pages.
(Continued)

*Primary Examiner* — Lonnie V Sweet
(74) *Attorney, Agent, or Firm* — XSENSUS LLP

(57) ABSTRACT

A method of operating a communications device for transmitting signals to and/or receiving signals from an infrastructure equipment of wireless communications network and transmitting signals to and/or receiving signals from one or more other communications devices in accordance with Device-to-Device, D2D, communications is provided. The method comprises determining that the communications device is to transmit one or more reference signals in accordance with one or more reference signal characteristics, transmitting the reference signals to the infrastructure equipment and/or one or more of the other communications devices in accordance with the determined reference signal characteristics, and performing measurements on the basis of signals received in response to the transmitted reference signals and/or other reference signals received from one or more of the other communications devices.

19 Claims, 9 Drawing Sheets

(51) Int. Cl.
*H04W 64/00* (2009.01)
*H04W 88/04* (2009.01)

(56) References Cited

U.S. PATENT DOCUMENTS

| | | | | |
|---|---|---|---|---|
| 2021/0219103 | A1* | 7/2021 | Wang | G01S 5/0236 |
| 2021/0377906 | A1* | 12/2021 | Bao | G01S 5/0205 |
| 2022/0014872 | A1* | 1/2022 | Balasubramanian | H04W 4/023 |
| 2022/0095296 | A1* | 3/2022 | Franke | G01S 5/0236 |
| 2022/0217674 | A1* | 7/2022 | Bao | H04W 64/00 |
| 2022/0346041 | A1* | 10/2022 | Ko | H04W 56/001 |
| 2023/0113017 | A1* | 4/2023 | Celik | H04W 76/23 370/329 |
| 2023/0296722 | A1* | 9/2023 | Shrestha | G01S 5/0269 455/456.1 |
| 2024/0031975 | A1* | 1/2024 | Baek | H04W 4/40 |
| 2024/0163830 | A1* | 5/2024 | Li | H04W 64/00 |
| 2024/0267939 | A1* | 8/2024 | Wei | H04W 64/006 |

OTHER PUBLICATIONS

Durrant-Whyte et al., "Simultaneous Localisation and Mapping (SLAM): Part I The Essential Algorithms", Available Online at: https://people.eecs.berkeley.edu/~pabbeel/cs287-fa09/readings/Durrant-Whyte_Bailey_SLAM-tutorial-I.pdf, Jun. 2006, pp. 1-9.
Bourdoux et al., "6G White Paper on Localization and Sensing", arXiv:2006.01779v1 [eess.SY], Jun. 2, 2020, pp. 1-38.
Holma et al., "LTE for UMTS OFDMA and SC-FDMA Based Radio Access", John Wiley & Sons, 2009, 450 pages.
Lu et al., "Cooperative Positioning System for Industrial IoT via mmWave Device-to-Device Communications", 2021 IEEE 93rd Vehicular Technology Conference (VTC2021-SPRING), IEEE, Apr. 25, 2021, 7 pages.
NTT DOCOMO, Inc., "Revised WID on New Radio Access Technology", 3GPP TSG RAN Meeting #78, RP-172834, Dec. 18-21, 2017, 11 pages.
3FPP, "Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.

* cited by examiner

METHODS, COMMUNICATIONS DEVICES, INFRASTRUCTURE EQUIPMENT, AND WIRELESS TELECOMMUNICATIONS SYSTEMS

CROSS-REFERENCE TO RELATED APPLICATIONS

The present disclosure is based on PCT filing PCT/EP2022/058499, filed on Mar. 30, 2022, which claims priority to European Patent Application No. 21177266.0, filed on Jun. 1, 2021, the content of each is incorporated herein by reference in its entirety.

BACKGROUND

Field of Disclosure

The present disclosure relates generally to wireless communications networks, and specifically to methods and devices for efficiently handling the transmission and use of reference signals by communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these and future networks, i.e. geographic locations where access to the networks is possible, may be expected to increase ever more rapidly.

Current and future wireless communications networks are expected to routinely and efficiently support communications with a wider range of devices associated with a wider range of data traffic profiles and types than previously developed systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario. In view of this there is expected to be a desire for more advanced wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device for transmitting signals to and/or receiving signals from an infrastructure equipment of wireless communications network and transmitting signals to and/or receiving signals from one or more other communications devices in accordance with Device-to-Device, D2D, communications. The method comprises determining that the communications device is to transmit one or more reference signals in accordance with one or more reference signal characteristics, transmitting the reference signals to the infrastructure equipment and/or one or more of the other communications devices in accordance with the determined reference signal characteristics, and performing measurements on the basis of signals received in response to the transmitted reference signals and/or other reference signals received from one or more of the other communications devices. The performed measurements are used to update a local map associated with at least one of the communications device and the infrastructure equipment on the basis of the performed measurements. The local map describes an environment of the at least one of the communications device and the infrastructure equipment.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
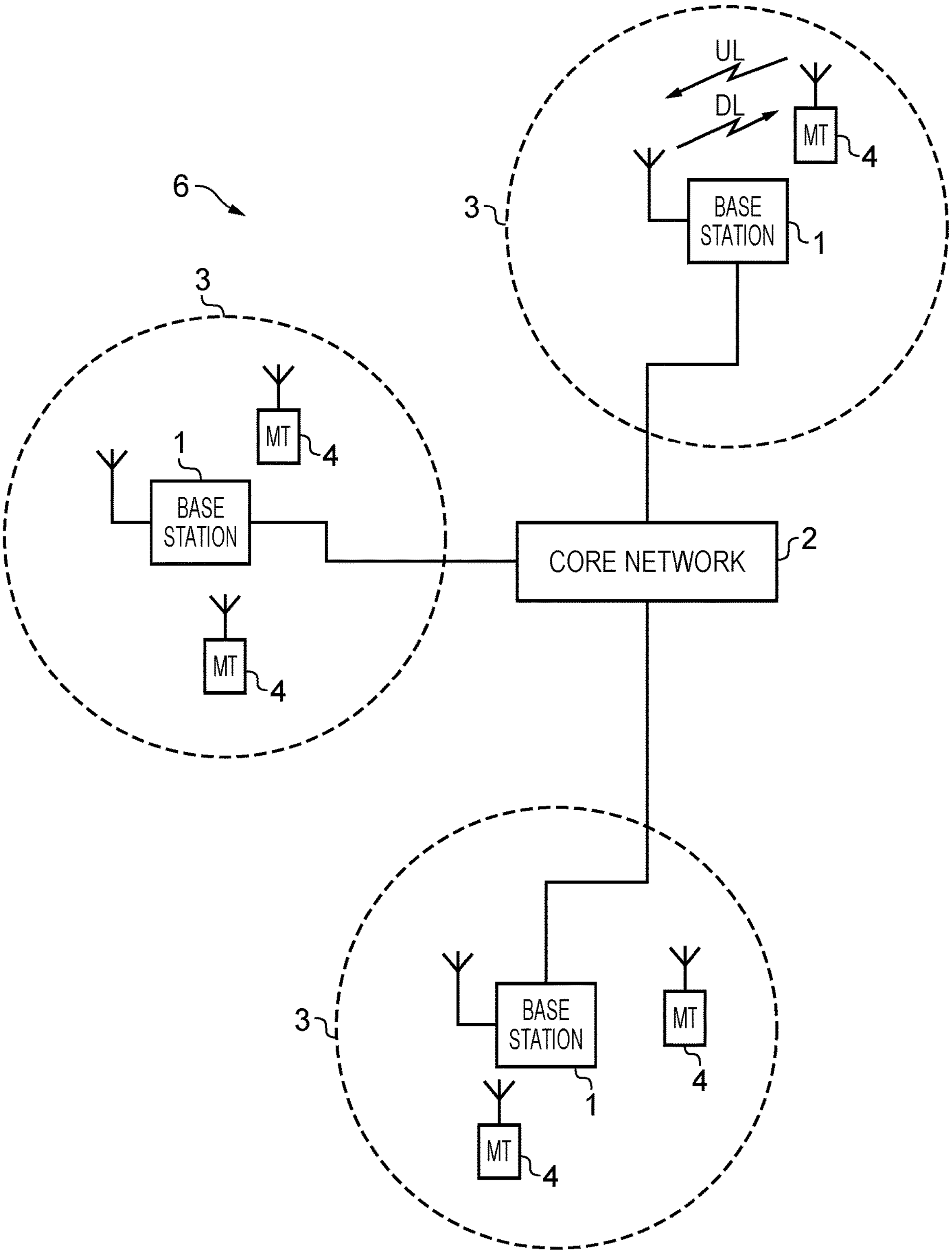
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink (DL). Data is transmitted from communications devices 4 to the base stations 1 via a radio uplink (UL). The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, embodiments of the present disclosure can also find application with wireless communications systems such as those referred to as 5G or New Radio (NR) Access Technology, and indeed with the advanced sixth generation (6G) of mobile telecommunications systems or any other future systems. The use cases that are considered for NR [2] include:

- Enhanced Mobile Broadband (eMBB);
- Massive Machine Type Communications (mMTC); and
- Ultra Reliable & Low Latency Communications (URLLC).

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
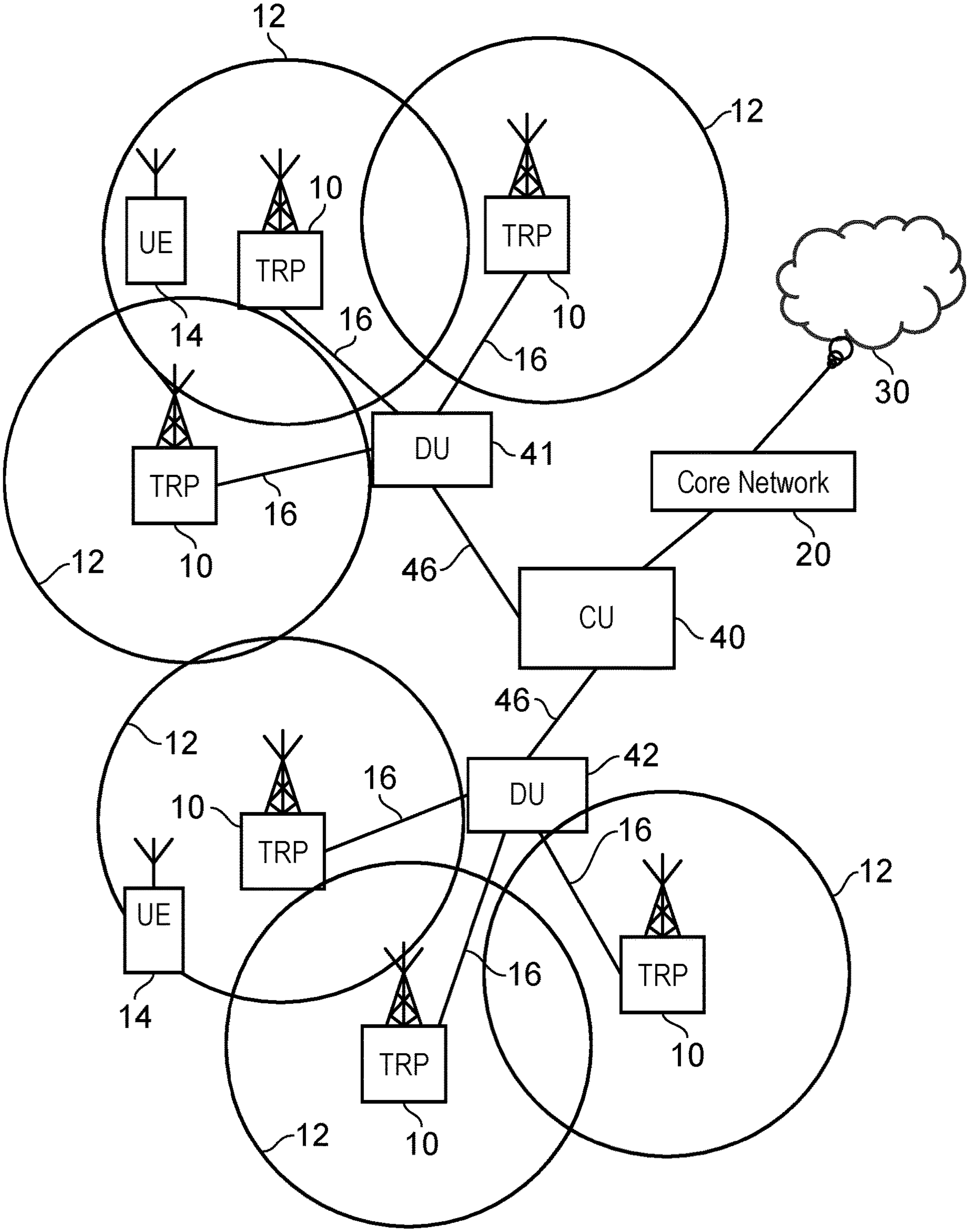
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards. The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
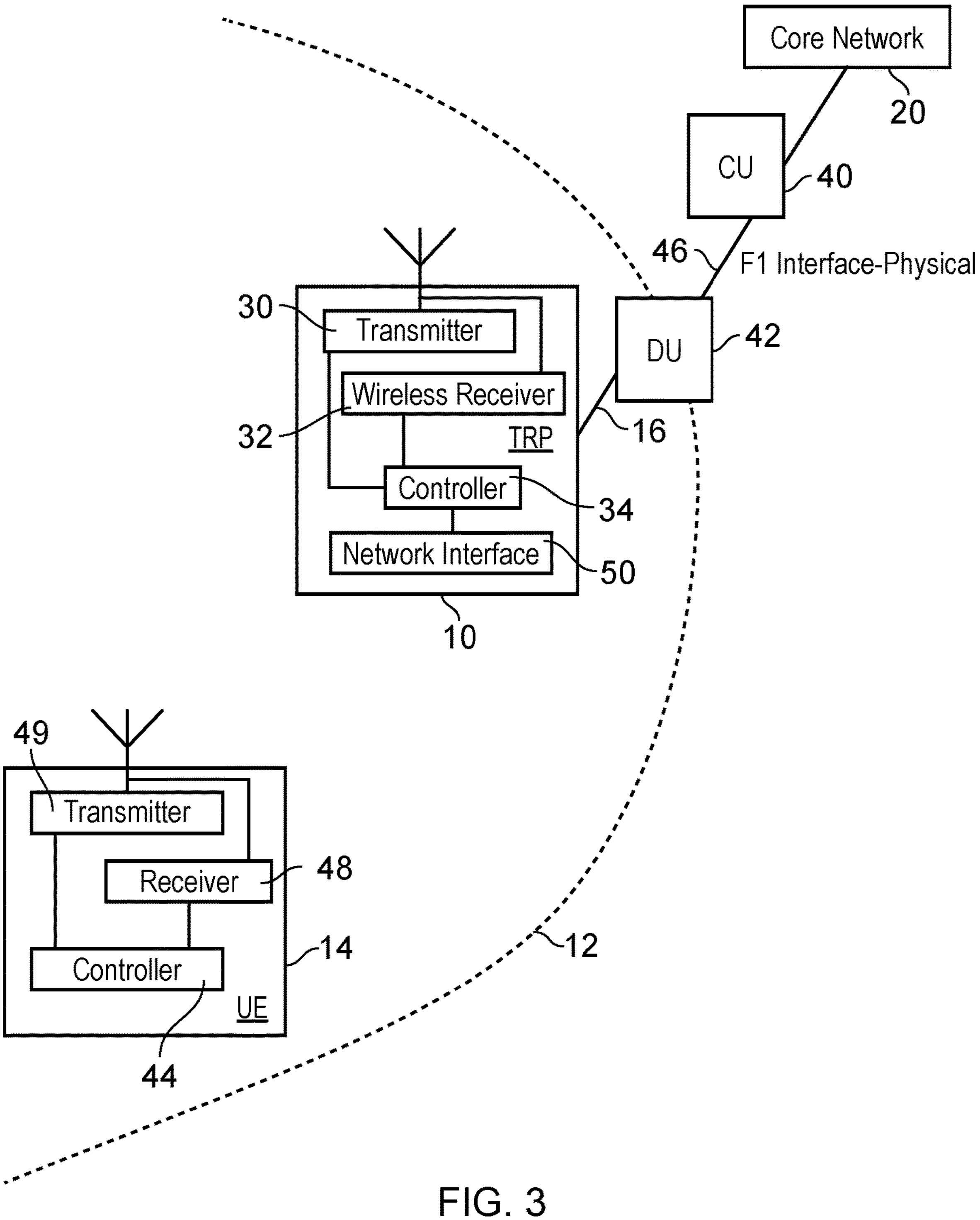
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Device-to-Device (D2D) and Sidelink Communications

Device-to-Device (D2D) communications is an aspect of mobile communications which has been established for devices to communicate directly with each other rather than via a wireless communications network. That is to say that radio signals representing data are transmitted via a wireless interface by one device and received by another to communicate that data, rather than the signals being transmitted to radio infrastructure equipment of a wireless communication network, which are then detected and decoded by the infrastructure equipment to recover that data and communicated on to a destination device.

Figure 4:
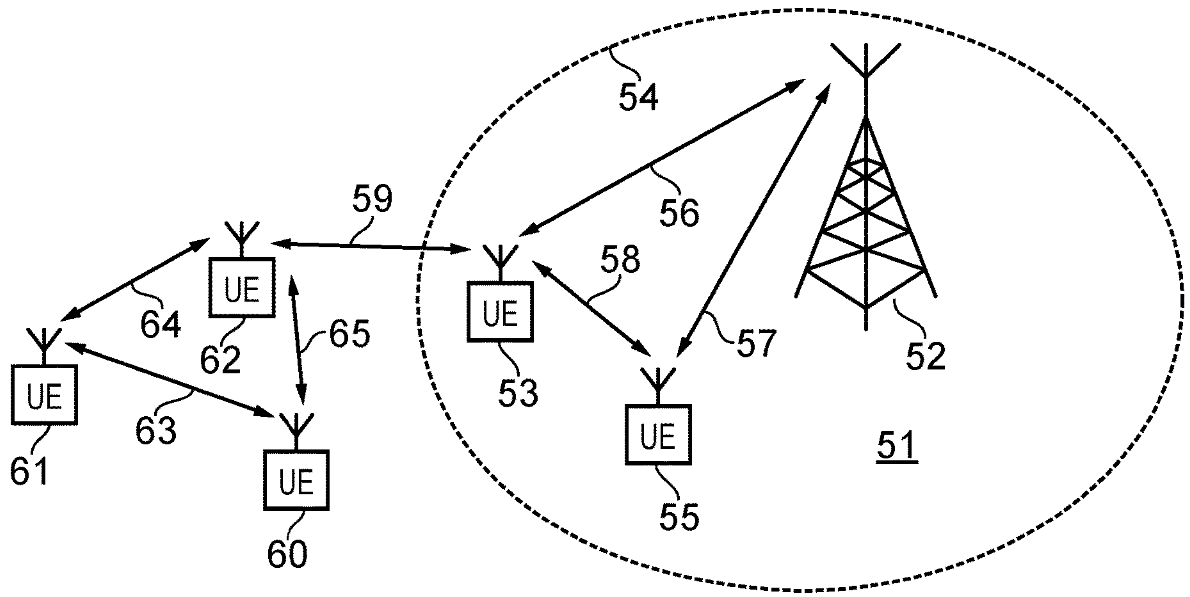
FIG. 4 schematically represents examples of communications devices communicating with each other in accordance with different examples of device-to-device (D2D) communications.

D2D communications can take different forms, which are illustrated in FIG. 4. As shown in FIG. 4, in one example two communications devices (UEs) 53, 55 are operating within a coverage area of a cell 51 provided by radio infrastructure equipment 52, which has a cell boundary 54 represented by a dashed line. The radio infrastructure equipment 52 may for example be a TRP 10 such as that shown in FIG. 2. As represented by lines 56, 57, the UEs 53, 55, may transmit and receive signals to the infrastructure equipment 52 to transmit or to receive data on an uplink or a downlink respectively of a wireless access interface formed by a wireless communications network of which the infrastructure equipment 52 forms part. However within the radio coverage area of the cell 51 the UEs 53, 55 may communicate directly between one another via a D2D wireless access interface as represented by a line 58. The UEs 53, 55 can be configured to transmit and to receive signals via a D2D wireless access interface which may be separate and not shared or overlap a frequency band of the wireless access interface provided by the infrastructure equipment 52. Alternatively the UEs 53, 55 may transmit and receive signals via a part of the wireless access interface provided by the infrastructure equipment 52. A D2D wireless access interface formed for one UE to transmit radio signals to another UE is referred to as a sidelink or PC5.

Another example of D2D communications is also shown in FIG. 4 where UEs fall outside a coverage area of a wireless communication network and so communicate directly with one another. As represented by lines 63, 64, 65, three UEs 60, 61, 62 are operable to transmit and receive signals representing data via sidelinks. These sidelinks 63, 64, 65 may be formed by a D2D wireless access interface which falls within a frequency band of the infrastructure equipment 52 or may be outside this frequency band.

However the UEs 60, 61, 62 organise access to a D2D wireless access interface autonomously without reference to a wireless access interface. In some cases, the UEs 60, 61, 62 may be pre-configured with some parameters for a D2D wireless access interface. As another example, one of the UEs 53 within the coverage area of the cell 51 acts as a relay node for one or more of the UEs 60, 61, 62 which are outside the coverage area as represented by a sidelink 59.

Here D2D communications of the form of sidelink 58 are referred to as in-coverage communications, D2D communications of the form of sidelink 59 are referred to as partial coverage communications, and D2D communications of the form of sidelinks 63, 64, 65 are referred to as out-of-coverage communications.

According to 3GPP standards such as LTE, whilst downlink and uplink communications are specified for transmissions from an infrastructure equipment such as a gNB to a UE and from a UE to a gNB respectively, sidelink communications are specified to realise UE-to-UE (device-to-device (D2D)) communication, especially for sidelink discovery, sidelink communication and vehicle to everything (V2X) sidelink communication between UEs. The LTE sidelink has the following characteristics as described below, which are reproduced from [3]:

Sidelink comprises sidelink discovery, sidelink communication, and V2X sidelink communication between UEs;

Sidelink uses uplink resources and a physical channel structure similar to uplink transmissions. However, some changes, noted below, are made to the physical channels;

The sidelink/D2D wireless access interface structure includes a physical sidelink control channel (PSCCH) for UEs to transmit control signalling to other UEs and a physical sidelink shared channel (PSSCH) for transmitting data to other UEs. Control messages transmitted on the PSCCH can indicate communications resources of the PSSCH via which the UE will transmit data to another UE. The control message for sidelink is referred to as sidelink control information (SCI). Therefore the PSCCH is mapped to the sidelink control resources and indicates resource and other transmission parameters used by a UE for PSSCH;

Sidelink transmission uses the same basic transmission scheme as the uplink transmission scheme. However, sidelink is limited to single cluster transmissions for all the sidelink physical channels. Furthermore, sidelink uses a one symbol gap at the end of each sidelink sub-frame. For V2X sidelink communication, PSCCH and PSSCH are transmitted in the same subframe;

The sidelink physical layer processing of transport channels differs from uplink transmission in the following steps:

Scrambling: for PSDCH and PSCCH, the scrambling is not UE-specific; and

Modulation: 256 QAM is not supported for sidelink. 64 QAM is only supported for V2X sidelink communication;

For PSDCH (physical sidelink discovery channel), PSCCH and PSSCH demodulation, reference signals similar to uplink demodulation reference signals are transmitted in the fourth symbol of the slot in normal cyclic prefix (CP) and in the third symbol of the slot in extended cyclic prefix. The sidelink demodulation reference signals sequence length equals the size (number of sub-carriers) of the assigned resource. For V2X sidelink communication, reference signals are transmitted in the third and sixth symbols of the first slot and the second and fifth symbols of the second slot in normal CP;

For PSDCH and PSCCH, reference signals are created based on a fixed base sequence, cyclic shift and orthogonal cover code. For V2X sidelink communication, the cyclic shift for PSCCH is randomly selected in each transmission;

For in-coverage operation, the power spectral density of the sidelink transmissions can be influenced by the eNB; and For measurement on the sidelink, the following basic UE measurement quantities are supported:

Sidelink reference signal received power (S-RSRP);

Sidelink discovery reference signal received power (SD-RSRP);

PSSCH reference signal received power (PSSCH-RSRP); and

Sidelink reference signal strength indicator (S-RSSI).

Currently, for 5G or New Radio (NR) standardisation, a sidelink has been specified in Release-16 for V2X communication, with the LTE sidelink being a starting point for the NR sidelink. For NR sidelink, the following sidelink physical channels are defined:

Physical Sidelink Shared Channel (PSSCH);

Physical Sidelink Broadcast Channel (PSBCH);

Physical Sidelink Control Channel (PSCCH); and

Physical Sidelink Feedback Channel (PSFCH).

Furthermore, the following sidelink physical signals are defined:

Demodulation reference signals (DM-RS);

Channel-state information reference signal (CSI-RS);

Phase-tracking reference signals (PT-RS);

Sidelink primary synchronization signal (S-PSS); and

Sidelink secondary synchronization signal (S-SSS).

Simultaneous Localization and Mapping (SLAM)

As progress is made on the sixth generation (6G) of mobile telecommunications systems, smarter, more adaptive, and more efficient methods of implementing wireless networks are being developed.

Traditionally, Simultaneous Localization and Mapping (SLAM) is a process by which a mobile robot is able to build a map of an environment, and at the same time, use this map to compute its own location. At least some elements of both SLAM and wireless communications are beginning to converge, where it is anticipated that future 6G systems can be integrated with SLAM by providing communications and sensing (i.e. localisation and mapping) at the same time. For example, a 6G waveform can be employed to provide good spectral and power efficiency as well as positioning and range measurements in 4D (i.e. range, velocity, azimuth, and elevation angle).

It is discussed in [4] how a map may be constructed from sensor results. Specifically, [4] teaches that: "SLAM is a process by which a mobile robot can build a map of an environment and at the same time use this map to deduce its location. In SLAM both the trajectory of the platform and the location of all landmarks are estimated on-line without the need for any a prior knowledge of location. In probabilistic form, the SLAM problem requires that the probability distribution to be computed for all time instances. This probability distribution describes the joint posterior density of the landmark locations and vehicle state (at certain time instance) given the recorded observations and control inputs up to and including time instance together with the initial state of the vehicle. In general, a recursive solution to the SLAM problem is desirable. Starting with an estimate of the distribution at certain time, the joint posterior, following a control and observations, is computed using Bayes Theorem. This computation requires that a state transition model and an observation model are defined describing the effect of the control input and observation respectively."

The performance of SLAM processes in mobile networks is introduced in [5]. Specifically, [5] describes that: "In SLAM, mobile devices are considered as sensors, with time-varying states (position, pose, as well as their derivatives), and landmarks (object), with fixed or slowly changing states. Both sensor states and landmark states are a priori unknown. A sensor moves through the environment and collects measurements in its local frame of reference related to the landmarks. These measurements may be from 6G radar-like signals originating from the mobile device or from fixed infrastructure. The sensor has an associated mobility model, describing the evolution of the sensor state statistically as it moves. SLAM algorithms aim to recover estimates of the sensor state (including the entire sensor state trajectory) as well as state estimates of the landmarks."

Applications of a map built in accordance with a SLAM process may include, for example, obstacle avoidance, trajectory planning, tracking, and virtual gaming. Furthermore, such maps can be beneficial to the performance of wireless communication itself, for example, adaptive scheduling, positioning-based wireless transmission optimisation, etc. Although the applications of mapping and localisation are likely to be primarily implementation-based, the manner in which a wireless communication system may be design in order to better serve mapping and localisation tasks may need more standardisation efforts.

D2D in SLAM

In the discussions of D2D relay/pairing and UE selection in 3GPP, there have been proposals to include additional access stratum (AS) layer criteria to differentiate between candidate relay UE/D2D pairing UEs in addition to non-access stratum (NAS) layer criteria, e.g. Uu link quality between a candidate relay UE and gNB, load of a candidate relay UE, RRC states of a candidate relay UE, cell ID of the serving cell of a candidate relay UE, access restrictions on the cell, service layer (SL) configuration, etc.

It is envisaged that D2D will play a part in SLAM. For example, different pairs/groups of UEs may form in order to perform positioning and mapping, and respectively, the positioning and mapping may be another input in the determination of how to form a D2D pairing/group. It is therefore envisaged that new selection criteria and/or selection procedures are necessary in order to support efficient operations between SLAM and telecommunications networks.

Figure 5:
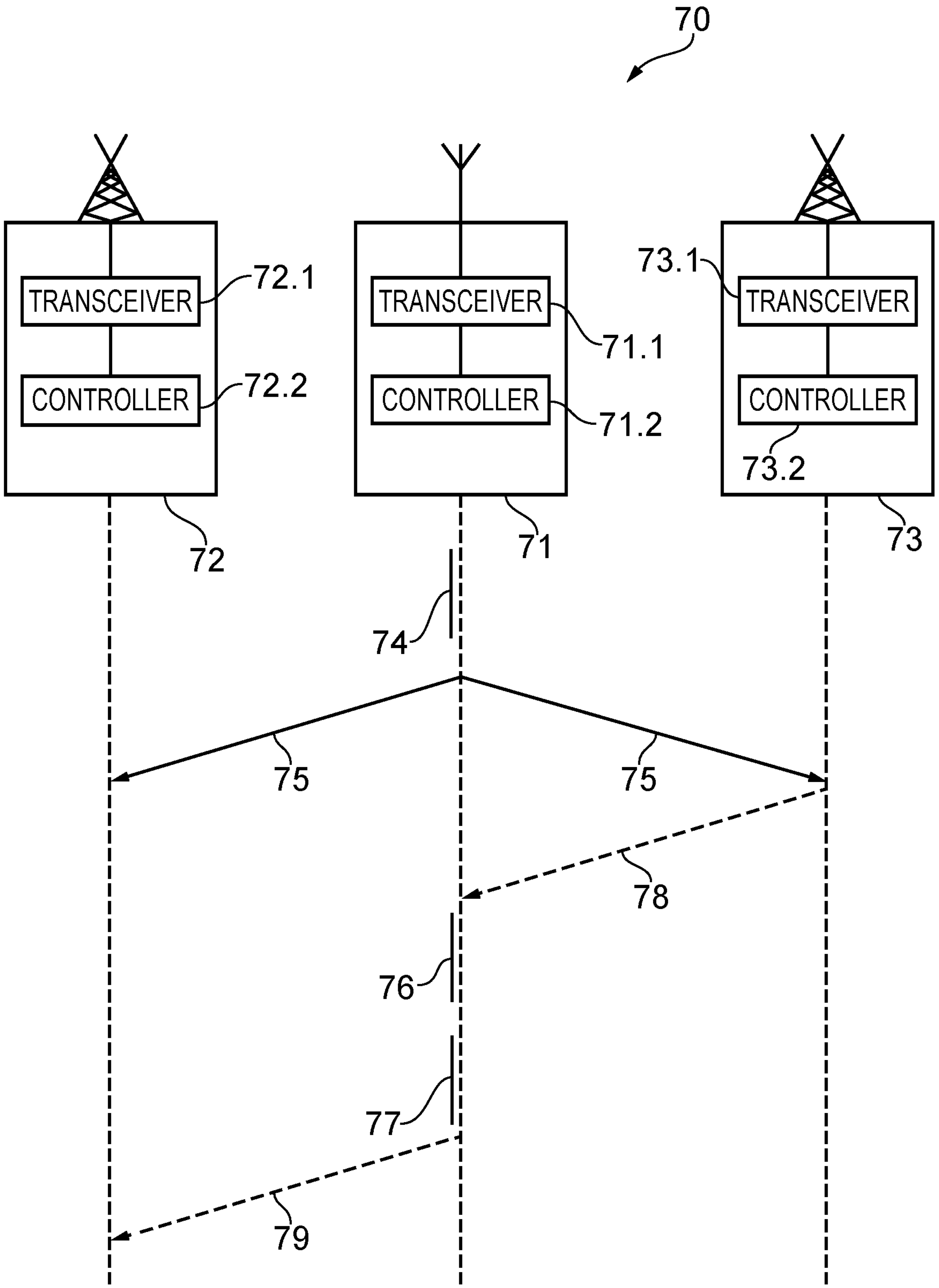
FIG. 5 is a part schematic, part message flow diagram representation of communications system comprising a communications device and infrastructure equipment in accordance with embodiments of the present technique.

FIG. 5 shows schematic representation of a wireless communications system 70 comprising a communications device 71 and an infrastructure equipment 72 forming part of a wireless communications network. The communications device 71 is configured to transmit signals to and/or to receive signals from the infrastructure equipment 72 and to transmit signals to and/or receive signals from one or more other communications devices 73 in accordance with Device-to-Device (D2D) communications. The communications device 71, infrastructure equipment 72, and one or more other communications devices 73 each comprise a transceiver (or transceiver circuitry) 71.1, 72.1, 73.1 and a controller (or controller circuitry) 71.2, 72.2, 73.2. Each of the controllers 71.2, 72.2, 73.2 may be, for example, a microprocessor, a CPU, or a dedicated chipset, etc. The transceivers (or transceiver circuitry) 71.1, 72.1, 73.1 of one or more of the communications device 71, the infrastructure equipment 72, and the one or more other communications devices 73 may comprise both a transmitter and a receiver, or may—instead of being a transceiver—be a standalone transmitter and receiver pair. It would be appreciated by those skilled in the art that the infrastructure equipment 72 (as well as in some arrangements the communications device 71, one or more other communications devices 73, and any other infrastructure equipment or communications devices operating in accordance with embodiments of the present technique) may comprise a plurality of (or at least, one or more) transceivers (or transceiver circuitry) 71.1, 72.1, 73.1.

Specifically, as is shown by FIG. 5, the transceiver circuitry 71.1 and the controller circuitry 71.2 of the communications device 71 are configured in combination to determine 74 that the communications device 71 is to transmit one or more reference signals in accordance with one or more reference signal characteristics, to transmit 75 the reference signals to the infrastructure equipment 72 and/or one or more of the other communications devices 73 in accordance with the determined reference signal characteristics, to perform 76 measurements on the basis of signals 78 received in response to the transmitted reference signals and/or other reference signals 78 received from one or more of the other communications devices 73, and to update 77 a local map associated with the communications device 71 on the basis of the performed measurements 76, wherein the local map describes an environment of the communications device 71. The communications device may then transmit 79 at least a part of the local map to the infrastructure equipment 72 (or indeed to one or more other communications devices 73 instead of or as well as to the infrastructure equipment 72). Furthermore, the infrastructure equipment 72 may update its local map (which describes an environment of the infrastructure equipment 72)—alternatively or in addition to the updating 78 of the communication device's local may by the communications device. The infrastructure equipment 72 may update its own local map on the basis of the reference signals 75 received from the communications device 71 and/or reference signals received from one or more of the other communications devices 73, on which the infrastructure equipment 72 may perform its own measurements, or indeed on (or additionally on) the basis of the received at least part of the local map of the communications device 71.

Essentially, embodiments of the present disclosure propose the transmission of an on-demand (or active) reference/discovery signal for use in building the local map among D2D devices, which may be used in order to support SLAM and D2D communications simultaneously. In addition, embodiments of the present disclosure describe new criteria for the consideration of SLAM in D2D pairings/groupings/re-selection and/or relay selection/re-selection.

Figure 6:
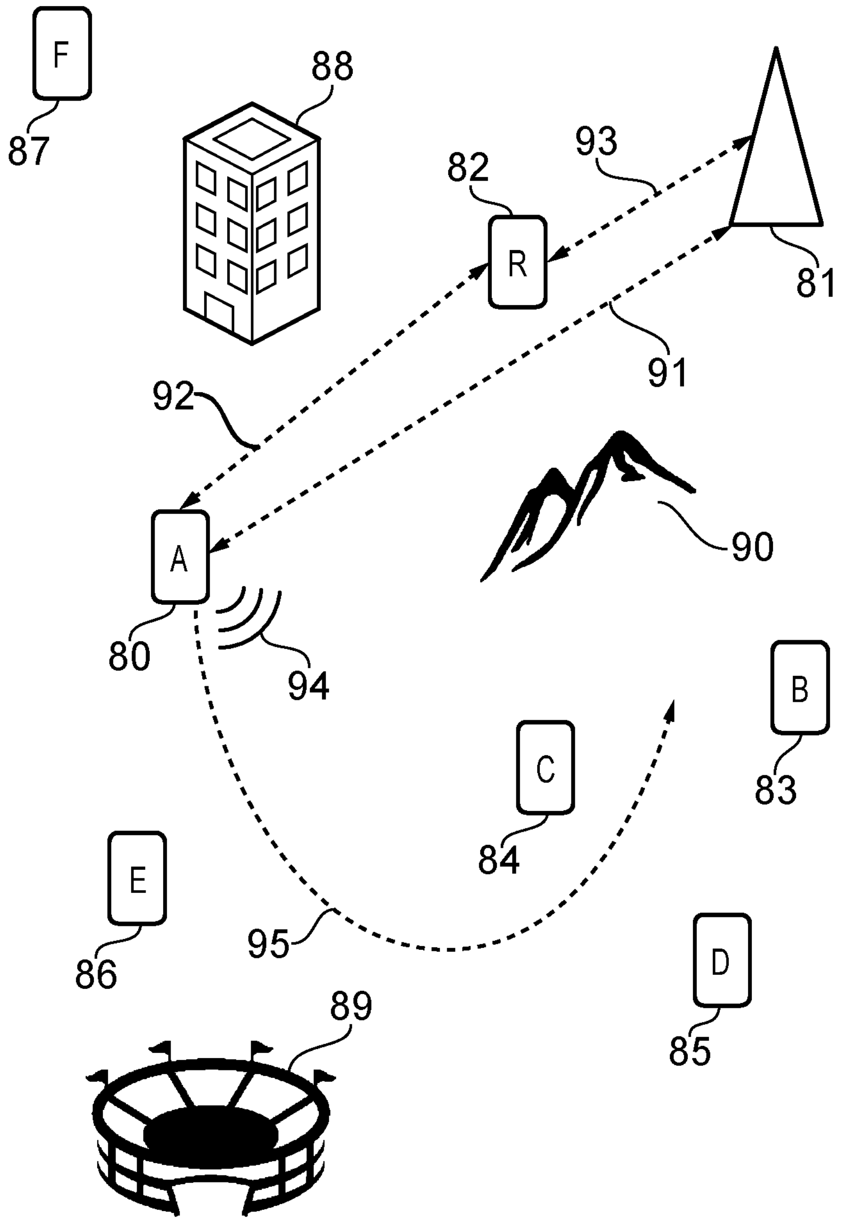
FIG. 6 illustrates an example environment of a communications device configured to transmit reference signals used to update a local map of the communications device in accordance with embodiments of the present technique.

FIG. 6 illustrates an example environment of a communications device 80 (which can be understood in some examples as corresponding to communications device 71 of FIG. 5) configured to transmit reference signals used to update a local map of the communications device 80 in accordance with embodiments of the present technique.

As can be seen in the example of FIG. 6, the communications device (A) (i.e. UE) 80 is configured to transmit signals to and receive signals from a central unit node 81 (which can be understood in some examples as corresponding to infrastructure equipment 72 of FIG. 5), which may for example be an infrastructure equipment/base station (i.e. a gNB or eNB) 81. The communications device 80 and central unit node 81 may be configured to communicate directly 91, or to transmit via a relay node (R) 82 which is configured to relay signals 92, 93, between the communications device 80 and the central unit node 81. Here, the relay node 82 may be a dedicated relay node, or may be another communications device which acts as a relay node for the communications device 80 and is capable of D2D communications.

Several other communications devices (B to F) 83, 84, 85, 86, 87 may also be located in the environment of the communications device 80, along with landmarks/obstacles 88, 89, 90. The other communications devices 83, 84, 85, 86, 87 can be understood in some examples as corresponding to the other communications devices 73 of FIG. 5—as indeed can, in some examples, the relay node 82. In at least some arrangements of embodiments of the present technique, one or more of these other communications devices 83, 84, 85, 86, 87 may be able (and indeed may be configured to) act as a relay node for the communications device 80 and/or for other communications devices.

The communications device 80 may receive a command from either the central unit node 81 or the relay node 82 (via the central unit node 81) to transmit one or more reference signals 94 for the purposes of discovery. These reference signals 94 may be any appropriate discovery or reference signals, such as for example Sounding Reference Signals (SRS) which are generally transmitted by one device (e.g. a UE) to another device (e.g. eNB) for that other device to determine the channel quality or signal quality. In other examples, the reference signal(s) may be sidelink synchronization signal(s) (SLSS) or positioning reference signal(s) (PRS). Such a reference signal command may be transmitted to more than one of the communications device 80 and other communications devices 83, 84, 85, 86, 87 at once by the central unit node 81/relay node 82. The plurality of devices to which the command is transmitted may be those within a predetermined area. Herein and in accordance with embodiments of the present disclosure, such discovery/reference signals 94 are termed on-demand reference signals.

Alternatively, the communications device 80 may determine itself—without receiving a command from the central unit node 81 or relay node 82—that it is to transmit the discovery/reference signals 94. The communications device 80 may determine so on the basis of its mobility (e.g. into a predetermined location or a new or only partially known area, such as towards UE F 87, where it is not aware of the extremities of the environment in the direction it has moved), on the basis that the communications device autonomously determines that a part of its local map is missing, comprises a blind spot, or otherwise needs updating, on the basis of its current network/D2D pairing/group connections (e.g. it no longer has one or more of these), or in accordance with a set periodicity with which it is configured to transmit these reference signals 94 or fulfil certain pre-defined conditions to allow the transmission of these reference signals which are configured by the central unit node 81; e.g. radio condition, number of active D2D links, battery power level, etc. Herein and in accordance with embodiments of the present disclosure, such discovery/reference signals 94 are termed active reference signals.

Whether or not the reference signals 94 are on-demand reference signals or active reference signals, the communications device 80 may be configured to transmit these reference signals in accordance with one or more of a number of configured parameters. These parameters may be pre-configured, included in the command to transmit the reference signals 94, or transmitted or broadcast by the central unit node 81/relay node 82 and received by the communications device 80 separately and in advance of the command to transmit the reference signals 94 and/or in advance of deployment of the communications device 80 or start of the transmission of periodic or conditional active reference signals by the communications device 80. The parameters may be dependent on the reason for the transmission of the reference signals 94 (e.g. different parameters may be used for periodic reference signal transmission, on-demand reference signals for the purposes of D2D pairing selection, and on-demand reference signals for the proposes of updating a local map in respect of a blind spot).

Such reference signal parameters/characteristics may include one or more of an indication of time radio resources within which the communications device 80 is to transmit the reference signals 94, an indication of frequency resources within which the communications device 80 is to transmit the reference signals 94, an indication of a periodicity with which the communications device 80 is to transmit the reference signals 94, an indication of a starting time at which the communications device 80 is to start transmitting the reference signals 94, an indication of an expiry time at which the communications device 80 is to stop transmitting the reference signals 94, an indication of one or more transmission power levels with which the communications device 80 is to transmit the reference signals 94, an indication of one or more directions in which the communications device 80 is to transmit the reference signals 94, an indication of which of the central unit node 81 and/or the other communications devices 83, 84, 85, 86, 87 the communications device 80 is to transmit the reference signals 94 to, and an indication of a route 95 that the communications device 80 is to follow while transmitting the reference signals 94.

The reference signals 94 may be transmitted by the communications device 80 for one or more purposes. Such a purpose may be for the communications device 80 (or indeed one of the other communications devices 83, 84, 85, 86, 87) to update its local map, because for example it may not have been updated for a while, or the communications device 80, other communications device(s) 83, 84, 85, 86, 87, or central unit node 81 may have identified a blind spot in the local map. The reference signals 94 may be used by the receiving communications device 83, 84, 85, 86, 87 to update/build the local map at that receiving communications device (through performing measurements on the reference signals 94), or may be responded to in kind by the receiving communications device 83, 84, 85, 86, 87 and/or central unit node 81 (and/or relay node 82) to the communications device 80, which performs measurements on the response to update/build its local map. The communications device 80 or other communications devices 83, 84, 85, 86, 87 may transmit part/all of the local map to the central unit node 81 upon updating it. The local map may also comprise a description of landmarks (e.g. building 88 or sports stadium 89) or obstacles (e.g. mountain/hill 90, which could also be considered a landmark) in the local environment of the communications device 80/other communications devices 83, 84, 85, 86, 87.

The local map, when updated, can be used by the communications device 80/other communications devices 83, 84, 85, 86, 87 for applications, as described above, such as obstacle avoidance, trajectory planning, tracking, virtual gaming, D2D pairing/group selection, adaptive scheduling, determining (by the communications device 80/other communications devices 83, 84, 85, 86, 87) of the device's own position, and so on. The local map of a communications device 80 may comprise any or all of: information describing locations of one or more landmarks or obstacles 88, 89, 90 in the environment of the communications device 80, information describing locations and/or velocities of one or more of the other communications devices 83, 84, 85, 86, 87 in the environment of the communications device 80, and information describing locations and/or velocities of one or more relay nodes 82 which are configured to relay signals between the communications device 80 and the central unit node 81. The environment and information described by the local map may be described relative to a location and/or a velocity of the communications device 80. The communications device 80 may use the local map to determine a current location of the communications device 80, and/or to determine one or more of the other communications devices 83, 84, 85, 86, 87 with which the communications device 80 is to form a D2D pairing or a D2D group, and/or to determine which of a plurality of candidate relay nodes 82, 83, 84, 85, 86, 87 the communications device 80 is to select in order for the selected relay node 82 to relay signals between the communications device 80 and the central unit node 81. Here, the one or more of the other communications devices 83, 84, 85, 86, 87 with which the communications device 80 is to form a D2D pairing or a D2D group may be those within a specified distance of the communications device 80, and/or may be those within a designated area of the local map, and/or may be those that are performing a specified application (e.g. are part of the same game as being played by the user of the communications device 80).

The reference signals 94 may be transmitted specifically by the communications device 80/other communications devices 83, 84, 85, 86, 87 for the purposes of forming D2D pairings or groups. For example, the communications device 80 may determine, upon performing measurements on received reference signals or on a response to its transmitted reference signals 94, that it is able to form a D2D pairing with UE F 87, and/or is able to form a D2D group with UEs B to E 83, 84, 85, 86.

The reference signals 94 may include information such as an indication of a location and/or a velocity of the communications device 80/other communications devices 83, 84, 85, 86, 87. Alternatively and/or in addition, each of the transmitted reference signals 94 may comprise an indication of at least a portion of the local map, where this portion of the local map being relevant to the central unit node 81 or the other communications device 80, 83, 84, 85, 86, 87, to which the reference signal 94 is transmitted.

As described above, a UE may be instructed, for example by a base station or a relay, to start transmitting reference signals in order to better help to generate a map. Here the map is the local map (which could be at the UE or at another UE) consisting of related D2D devices, or the map may consist of both some landmarks and D2D devices nearby.

The reference signal transmitted by the UE could be a newly defined (e.g. by the base station or relay) reference signal, or could be an existing discovery signal, SRS, or any existing UE specific reference signal which is reused for the purposes of map generation as described herein in accordance with embodiments of the present technique. In general, reference signals described herein in accordance with embodiments of the present disclosure are not be only applicable for SLAM, but can also be used for other any other purposes such as, or which require, generation/updating of local maps, formation/reselection of D2D pairings or groups, selection/reselection of relays, adaptive scheduling, etc.

As described above, it is up to the base station or relay node to configure such reference signal parameters/characteristics/configurations. In order to improve the accuracy of location and direction measurements, the interference of reference signals should be minimised. The central unit may configure the time/frequency resources to be used for the transmission of reference signal such that they do not overlap when reference signals are to be transmitted by multiple UEs. Similarly, transmission power may also be controlled. For example, if the interference level is high, the transmission power of reference signals may be minimised so as to reach only the service cell or the UEs within the same cell. On the other hand, if the interference is low, the transmission power of reference signals may be increased so as to reach neighbour cells or the UEs in neighbour cells with appropriate power levels for the performance of accurate measurements.

It is possible that the map that has been established by a UE has a blind spot/area that cannot be recognised by the base station or any other UEs. When a UE moves to such area, e.g. from the location it reports to a central unit (e.g. base station or relay), the central unit will instruct this UE to start transmitting a reference signal (e.g. discovery signal) to help to complete the map. It may alternatively be the case that the UE itself autonomously detects the blind spot, and on this basis determines that it is to transmit the (active) reference signals.

The discovery/reference signal could be sent from a UE to another UE. Such a discovery signal will activate surrounding UEs to wake up and work together to complete a map. Then, the UE may start measuring received reference/discovery signals or responses to its transmitted reference/discovery signals to determine measurements such as, for example, angle, delay, orientation, timestamp, etc. The UEs may then feedback such measurements or local map which has been updated in accordance with such measurements with each other or to the central unit. The UEs who receive such discovery signal can decide whether they want to participate in such map construction, depending on factors such as their power level, mobility status, etc. The discovery signal itself should include—if the purpose of the reference/discovery signals is for the performance of SLAM—an indication that this discovery signal is to trigger to perform SLAM. This indication may be explicit, or may be implicit in that certain values of certain communications parameters (e.g. the time and/or frequency resources used for transmission of the reference signals) indicate that the reference signal(s) are for SLAM. If the discovery signal is intended to be received by the UEs within a certain area, for example an identified blind spot, then additional configuration/parameters may be designated. For example, such additional parameters may include transmission power and direction with which the reference signals are transmitted. Such a configuration may be received from any node who has such overall map information, for example, base station, relay node or D2D device.

Alternatively (or in addition), the discovery/reference signal could be sent from a UE to a central unit or vice versa. Here, such a discovery signal may be transmitted from UE to central unit or from central unit to UE while the UE is moving around. The expected migration path of the UE can be designated by a central unit in advance.

New signalling may be established to support active discovery signals for SLAM. For active discovery signals transmitted between a central unit and UEs, the information could include the discovery signal related information (e.g. time/frequency information, periodicity, expiry time etc.), and migration path related information, if any. If the central unit wants to designate the moving path of that UE, it can include such information in the discovery signal configuration message. For example, if the central unit recognises that there is a blind spot and would like a UE to follow a path that most optimally (or at least adequately) covers the blind spot, then the central unit can send such configuration information to UE in the form of, for example, a waypoint, or a direction, etc. For active discovery signals transmitted between UEs, information such as application type or the name of a game may be included in the discovery message/reference signals in order to restrict the transmission/reception of such discovery signals to be only by permitted UEs, which are therefore able to complete the map among themselves. In other words, each of the transmitted reference signals comprises an indication that only a specified subset of the other communications devices are to receive the reference signal and to transmit to the communications device a response to the reference signal.

Figure 7:
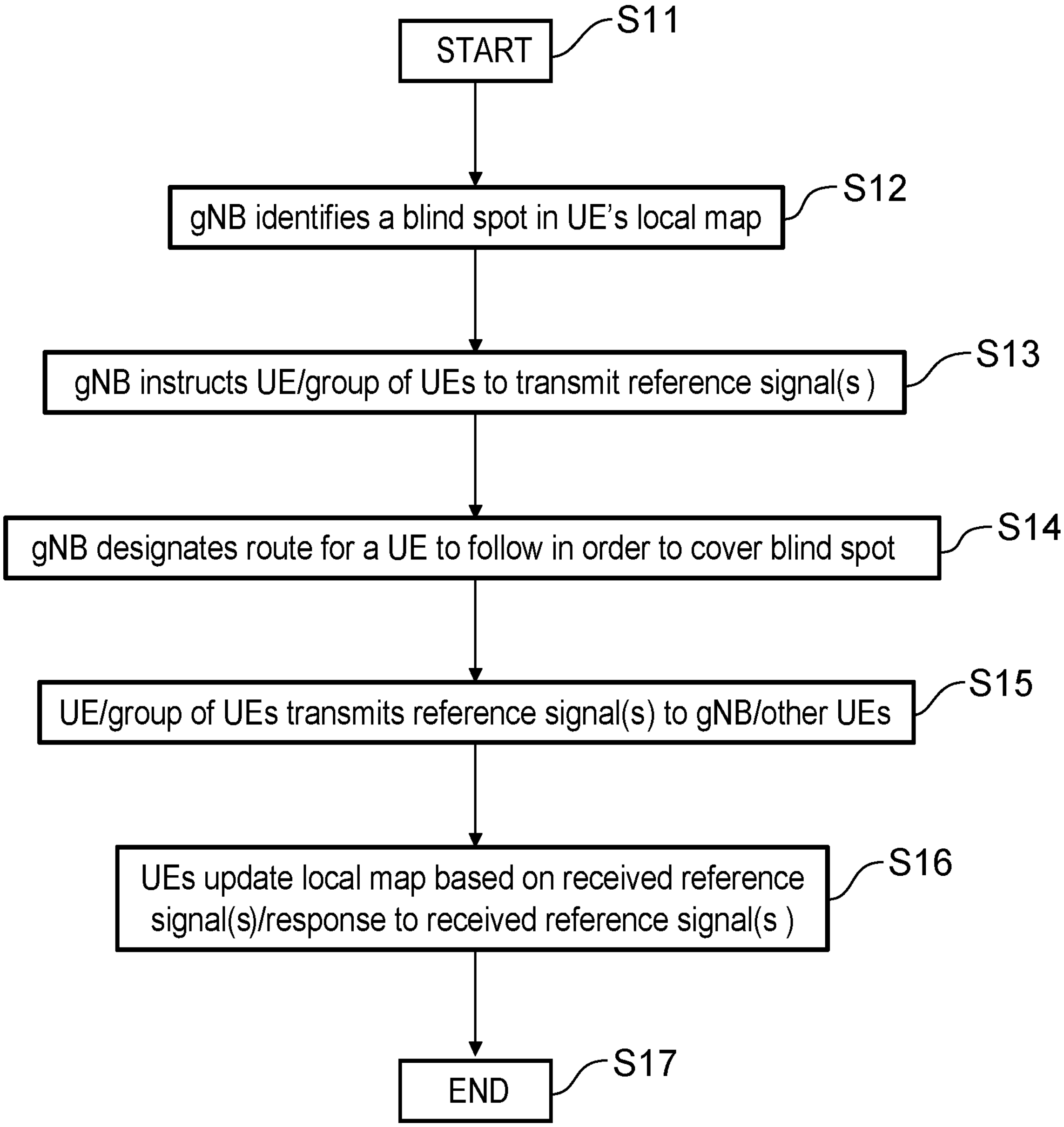
FIG. 7 shows a first flow diagram illustrating an example method of filling a blind spot in a local map in accordance with embodiments of the present technique.

FIG. 7 shows a flow diagram illustrating a first example method of filling a blind spot in a local map in accordance with embodiments of the present technique.

The method begins in step S11. The method comprises, in step S12, identifying (e.g. by a gNB) a blind spot in a map (which may be a map of the gNB or a map of a UE). In step S13, the process instructing (e.g. by the gNB) a UE or a group of UEs to begin transmitting reference signals, where such reference signals should be transmitted in accordance with a configuration/parameters either already broadcast/otherwise indicated to the UE(s) or included within the instruction to begin transmitting the reference signals. The method may comprise, in step S14, designating (e.g. by the gNB) a route for at least one of the UEs to follow while transmitting the reference signals in order to cover the blind spot. Such a route designation may be indicated along with the other configuration information, or separately—for example, reference signal parameters may also have been broadcast by the gNB before the blind spot is identified, and the gNB simply needs to instruct the UE/group of UEs to begin transmitting reference signals in accordance with the pre-configured parameters while travelling along a specified route or to a specified location in order to cover the blind spot. In step S15, the process then comprises the transmission of reference signals by the UE/group of UEs to the gNB and/or others of the group of UEs, before in step S16, updating (by one or more of the UEs) a local map associated with at least one of the UEs based on the received reference signal(s) or signals transmitted by those UEs in response to receiving the reference signals. The process ends in step S17.

FIG. 7 is performed by a gNB with a UE/group of UEs where the gNB identifies a blind spot in a local map, although the skilled person would appreciate that this is merely an example and any node that has access to the local map of the UE(s) could initiate the procedure. However, in any case, it will be the central node that configures the reference signal parameters as the central node will have a better overview on factors like mobile node distribution, interference levels etc. As such, if it is a D2D device that determines a blind spot in its or another D2D device's local map, and it is nearby such a blind spot, it will have two options:

- Report the blind spot to the gNB/relay and leave it to this central node to initiate the required corresponding procedure; or
- Report the blind spot to the gNB and either wait for the gNB to send the corresponding reference signal configurations for this UE or determine that the D2D UE should use a pre-configured reference signal configuration to begin transmitting the reference signals if it fulfils certain pre-configured criteria.

Furthermore, those skilled in the art would appreciate that the detection of a blind spot as a trigger to beginning the transmission of reference signals is merely an example. The trigger may be one of a number of things, comprising but not limited to, determining (either by the central unit node or autonomous UE transmitting active reference signals) that the map is not accurate or accurate enough, determining (either by the central unit node or autonomous UE transmitting active reference signals) that the local map has not been updated for longer than a threshold time (this may be in accordance with a configured periodicity for the UEs to trigger transmission of reference signals), determining (either by the central unit node or autonomous UE transmitting active reference signals) that the UE should select/reselect a relay node or a D2D pairing/group, etc.

Figure 8:
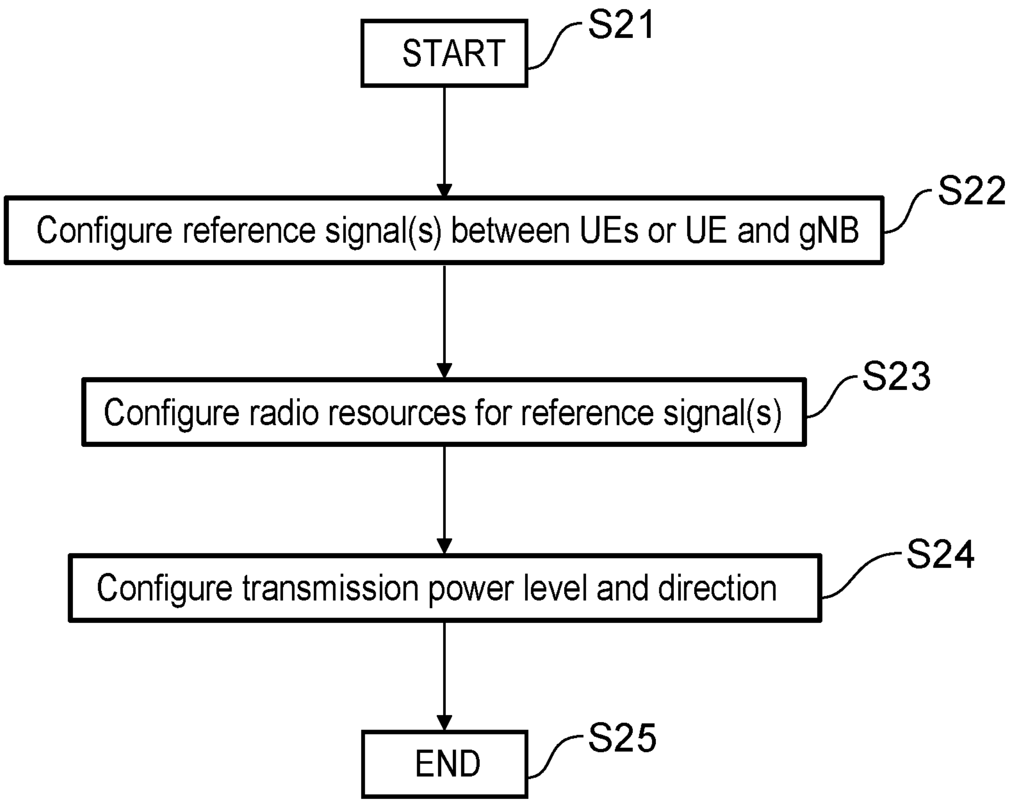
FIG. 8 shows a second flow diagram illustrating an example method of configuring reference signals in accordance with embodiments of the present technique.

FIG. 8 shows a flow diagram illustrating a second example method of configuring reference signals in accordance with embodiments of the present technique.

The method begins in step S21. The method comprises, in step S22, configuring (e.g. by a gNB) reference signals to be transmitted between UEs or between UE(s) and the gNB/relay node. In step S23, the process configuring (e.g. by the gNB) radio resources (i.e. frequency and time resources) in which the reference signals are to be transmitted. These resources may be resources of a wireless access interface (for discovery/reference signals transmitted in the uplink or downlink) and or resources of a sidelink interface (for discovery/reference signals transmitted between D2D devices). The method may then comprise, in step S24, configuring (e.g. by the gNB) one or more transmission power levels with which and one or more directions in which the reference signals are to be transmitted. The process ends in step S25.

As such, FIG. 8 shows one example of how a reference signal may be configured. Some or all of the steps may be carried out, with these being indicated to UE(s) either individually or in combination, and one or more other parameters (e.g. periodicity, starting time, expiry time, the central unit node(s) D2D device(s) to transmit to, and a route to traverse) may also be included Those skilled in the art would appreciate that gNB may not need to perform the example method of FIG. 8 step-by-step, and that the gNB may not need to follow the order strictly.

The reference signal itself can, as described above, be a newly defined reference signal or may re-use current reference signals such as discovery signals (if between UEs), and SRS (if between UE and base station). However in either case, in accordance with embodiments of the present disclosure, the reference signal may need additional new configurations, depending on whether:

- The reference signal is a on demand reference signal and not an always-on reference signal, and furthermore, whether the reference signal is to have functionality for SLAM in addition to its original purpose (e.g. discovery, channel estimation, etc.);
- The reference signal is a reference signal that is related to characteristics of SLAM. For example, only UE(s) which are a specific area such as a blind spot, or congestion area, or operating during a specific time (e.g. during rush hour where map accuracy requirements are higher, or when family members are travelling back from office/school and therefore precision and accuracy requirements are higher) will need to transmit such reference signal to a specific other UE/a group of UEs (with direction configurations);
- Depending on the environment (if known)—for example, depending on the gNB's knowledge of the radio propagation characteristics, UE distribution/location, mobility status, interference levels etc., the gNB may configured parameters such as transmission power, duration, and periodicity of the reference signal differently; and
- The resources for on-demand reference signal(s) can be fully or partially shared for that of always-on reference signal. For example, when on-demand reference signals are activated, an always-on reference signal is temporarily suspended. In another example, the density of reference signals in time/frequency resources is changed in response to the on-demand request.

In accordance with at least some embodiments of the present disclosure, new criteria/restrictions may be introduced in D2D pairings/groupings after a local map has been constructed. For example, gainers who are within a certain area may be allowed to form a team. Such new criteria may comprise (but are not limited to) distance, where only the UEs that are within a certain distance of one another may be allowed to form a D2D pair/group, and direction/mapping, where only the UEs that are within a certain area on the map can be allowed to form a D2D pair/group.

In accordance with at least some embodiments of the present disclosure, new information may need to be included in the reference/discovery messages. Such new information may include (but is not limited to) UE positioning information, and designated map areas where D2D pairings/groupings are allowed or are configured.

Figure 9:
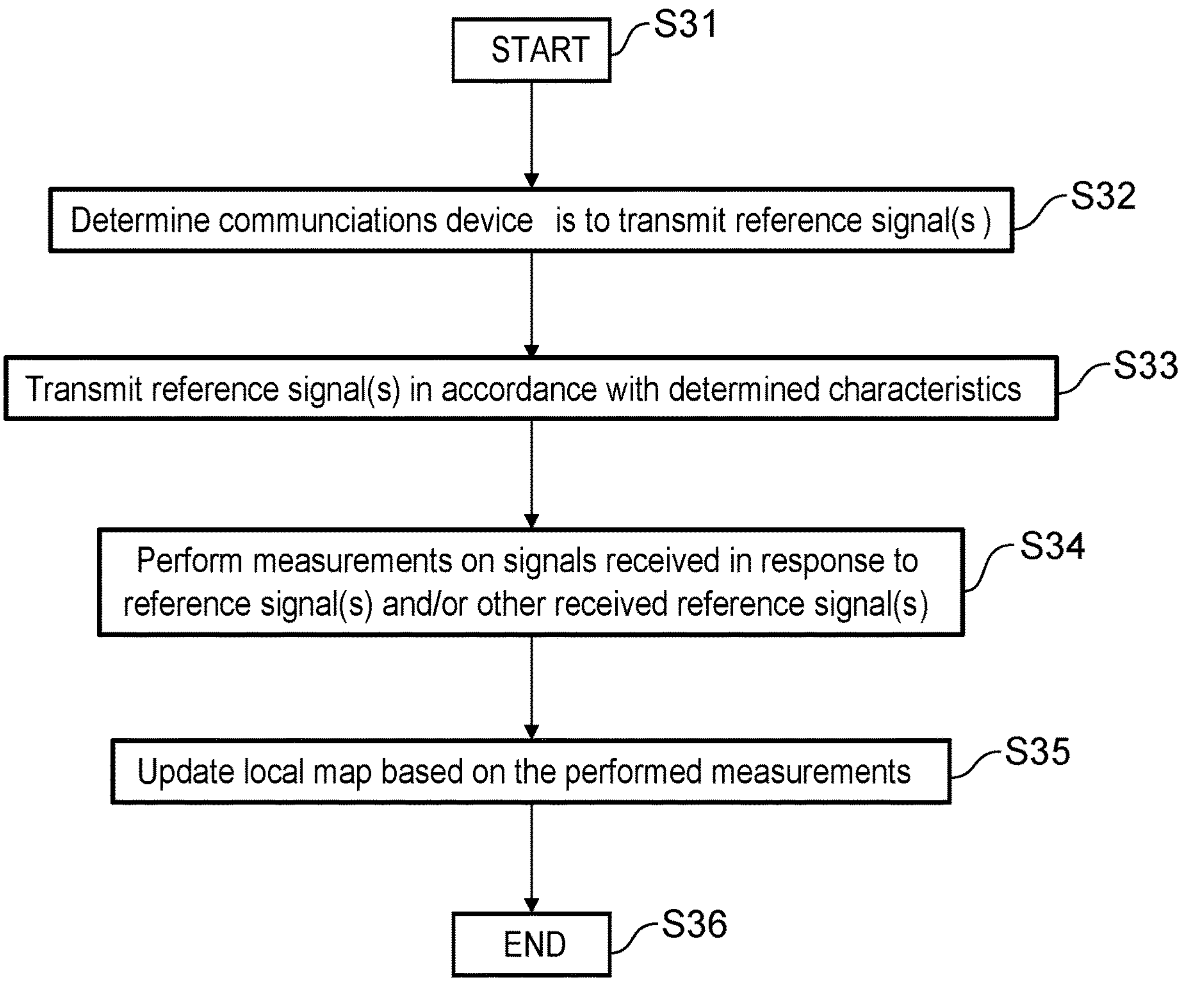
FIG. 9 shows a third flow diagram illustrating a process of communications in a communications system comprising a communications device and infrastructure equipment in accordance with embodiments of the present technique.

FIG. 9 shows a flow diagram illustrating a third example process of communications in a communications system in accordance with embodiments of the present technique. The process shown by FIG. 9 is a method of operating a communications device for transmitting signals to and/or receiving signals from an infrastructure equipment of wireless communications network and transmitting signals to and/or receiving signals from one or more other communications devices in accordance with Device-to-Device (D2D) communications.

The method begins in step S31. The method comprises, in step S32, determining that the communications device is to transmit one or more reference signals in accordance with one or more reference signal characteristics. In step S33, the process transmitting the reference signals to the infrastructure equipment and/or one or more of the other communications devices in accordance with the determined reference signal characteristics. The method then comprises, in step S34, performing measurements on the basis of signals received in response to the transmitted reference signals and/or other reference signals received from one or more of the other communications devices. In step S35, the process comprises updating a local map associated with the communications device on the basis of the performed measurements, wherein the local map describes an environment of the communications device. Again, in addition or alternatively to the updating of the communications device's local map in step S35, the method may comprise updating, by the infrastructure equipment, its own local map (which describes an environment of the infrastructure equipment) on the basis of the reference signals received from the communications device and/or reference signals received from one or more of the other communications devices, on which the infrastructure equipment may perform its own measurements. The process ends in step S36.

Those skilled in the art would appreciate that the method shown by any of FIGS. 7, 8, and 9 may be adapted in accordance with embodiments of the present technique. For example, other intermediate steps may be included in these methods, or the steps may be performed in any logical order. Furthermore, though embodiments of the present technique have been described largely by way of the example communications system shown in FIGS. 5 and 6, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting signals to and/or receiving signals from an infrastructure equipment of wireless communications network and transmitting signals to and/or receiving signals from one or more other communications devices in accordance with Device-to-Device, D2D, communications, the method comprising determining that the communications device is to transmit one or more reference signals in accordance with one or more reference signal characteristics, transmitting the reference signals to the infrastructure equipment and/or one or more of the other communications devices in accordance with the determined reference signal characteristics, and performing measurements on the basis of signals received in response to the transmitted reference signals and/or other reference signals received from one or more of the other communications devices, wherein the performed measurements are used to update a local map associated with at least one of the communications device and the infrastructure equipment on the basis of the performed measurements, wherein the local map describes an environment of the at least one of the communications device and the infrastructure equipment.

Paragraph 2. A method according to Paragraph 1, wherein each of the transmitted reference signals comprises an indication that the reference signal is for a Simultaneous Localization and Mapping, SLAM, process being performed by the communications device.

Paragraph 3. A method according to Paragraph 2, wherein the indication is implicitly indicated by a value of at least one communications parameter of the transmitted reference signals.

Paragraph 4. A method according to any of Paragraphs 1 to 3, wherein the transmitted reference signals are discovery signals.

Paragraph 5. A method according to any of Paragraphs 1 to 4, wherein the transmitted reference signals are Sounding Reference Signals, SRS.

Paragraph 6. A method according to any of Paragraphs 1 to 5, wherein the transmitted reference signals are positioning reference signals, PRS, used for positioning.

Paragraph 7. A method according to any of Paragraphs 1 to 6, wherein the transmitted reference signals are sidelink synchronization signals, SLSS, used for synchronisation.

Paragraph 8. A method according to any of Paragraphs 1 to 7, wherein the determining that the communications device is to transmit the reference signals comprises receiving a command from either the infrastructure equipment or a relay node configured to relay signals between the communications device and the infrastructure equipment, wherein the command indicates that the communications device is to transmit the reference signals.

Paragraph 9. A method according to Paragraph 8, wherein the command comprises an indication of the one or more reference signal characteristics in accordance with which the reference signals are to be transmitted.

Paragraph 10. A method according to Paragraph 9, wherein the one or more reference signal characteristics are one or more of:

an indication of time radio resources within which the communications device is to transmit the reference signals, an indication of frequency resources within which the communications device is to transmit the reference signals, an indication of a periodicity with which the communications device is to transmit the reference signals, an indication of a starting time at which the communications device is to start transmitting the reference signals, an indication of an expiry time at which the communications device is to stop transmitting the reference signals, an indication of one or more transmission power levels with which the communications device is to transmit the reference signals, an indication of one or more directions in which the communications device is to transmit the reference signals, an indication of which of the infrastructure equipment and/or the other communications devices the communications device is to transmit the reference signals to, and an indication of a route that the communications device is to follow while transmitting the reference signals.

Paragraph 11. A method according to any of Paragraphs 8 to 10, wherein the communications device receives the command on the basis that the local map comprises a blind spot.

Paragraph 12. A method according to any of Paragraphs 8 to 11, wherein the communications device receives the command on the basis that the local map has not been updated for longer than a threshold time.

Paragraph 13. A method according to any of Paragraphs 1 to 12, wherein the determining that the communications device is to transmit the reference signals comprises determining that the local map comprises a blind spot.

Paragraph 14. A method according to any of Paragraphs 1 to 13, wherein the determining that the communications device is to transmit the reference signals comprises determining that the local map has not been updated for longer than a threshold time.

Paragraph 15. A method according to any of Paragraphs 1 to 14, wherein the determining that the communications device is to transmit the reference signals comprises determining that the communications device is to transmit the reference signals in accordance with a preconfigured periodicity.

Paragraph 16. A method according to any of Paragraphs 1 to 15, wherein the determining that the communications device is to transmit the reference signals comprises determining the one or more reference signal characteristics in accordance with which the reference signals are to be transmitted on the basis of an indication of the one or more reference signal characteristics which has been previously received by the communications device.

Paragraph 17. A method according to any of Paragraphs 1 to 16, wherein each of the transmitted reference signals comprises an indication that only a specified subset of the other communications devices are to receive the reference signal and to transmit to the communications device a response to the reference signal.

Paragraph 18. A method according to any of Paragraphs 1 to 17, wherein each of the transmitted reference signals comprises an indication of a location and/or a velocity of the communications device.

Paragraph 19. A method according to any of Paragraphs 1 to 18, wherein each of the transmitted reference signals comprises an indication of at least a portion of the local map associated with the communications device, the at least the portion of the local map being relevant to the infrastructure equipment or the other communications device to which the reference signal is transmitted.

Paragraph 20. A method according to any of Paragraphs 1 to 19, comprising updating the local map associated with the communications device on the basis of the performed measurements.

Paragraph 21. A method according to Paragraph 20, comprising transmitting at least part of the local map associated with the communications device to the infrastructure equipment and/or one or more of the other communications devices.

Paragraph 22. A method according to Paragraph 20 or Paragraph 21, wherein the local map associated with the communications device comprises information describing locations of one or more landmarks in the environment of the communications device.

Paragraph 23. A method according to any of Paragraphs 20 to 22, wherein the local map associated with the communications device comprises information describing locations and/or velocities of one or more of the other communications devices in the environment of the communications device.

Paragraph 24. A method according to any of Paragraphs 20 to 23, wherein the local map associated with the communications device comprises information describing locations and/or velocities of one or more relay nodes which are configured to relay signals between the communications device and the infrastructure equipment.

Paragraph 25. A method according to any of Paragraphs 20 to 24, wherein the environment and information described by the local map associated with the communications device are described relative to a location and/or a velocity of the communications device.

Paragraph 26. A method according to any of Paragraphs 20 to 25, wherein the communications device uses the local map associated with the communications device to determine a current location of the communications device.

Paragraph 27. A method according to any of Paragraphs 20 to 26, wherein the communications device uses the local map associated with the communications device to determine one or more of the other communications devices with which the communications device is to form a D2D pairing or a D2D group.

Paragraph 28. A method according to Paragraph 27, wherein the one or more of the other communications devices with which the communications device is to form a D2D pairing or a D2D group are those within a specified distance of the communications device.

Paragraph 29. A method according to Paragraph 27 or Paragraph 28, wherein the one or more of the other communications devices with which the communications device is to form a D2D pairing or a D2D group are those within a designated area of the local map associated with the communications device.

Paragraph 30. A method according to any of Paragraphs 27 to 29, wherein the one or more of the other communications devices which with the communications device is to form a D2D pairing or a D2D group are those that are performing a specified application.

Paragraph 31. A method according to any of Paragraphs 20 to 30, wherein the communications device uses the local map associated with the communications device to determine which of a plurality of candidate relay nodes the communications device is to select in order for the selected relay node to relay signals between the communications device and the infrastructure equipment.

Paragraph 32. A communications device comprising transceiver circuitry configured to transmit signals to and/or to receive signals from a wireless communications network and to transmit signals to and/or to receive signals from one or more other communications devices in accordance with Device-to-Device, D2D, communications, and controller circuitry configured in combination with the transceiver circuitry to determine that the communications device is to transmit one or more reference signals in accordance with one or more reference signal characteristics, to transmit the reference signals to the infrastructure equipment and/or one or more of the other communications devices in accordance with the determined reference signal characteristics, and to perform measurements on the basis of signals received in response to the transmitted reference signals and/or other reference signals received from one or more of the other communications devices, wherein the performed measurements are used to update a local map associated with at least one of the communications device and the infrastructure equipment on the basis of the performed measurements, wherein the local map describes an environment of the at least one of the communications device and the infrastructure equipment.

Paragraph 33. Circuitry for a communications device comprising transceiver circuitry configured to transmit signals to and/or to receive signals from a wireless communications network and to transmit signals to and/or to receive signals from one or more other communications devices in accordance with Device-to-Device, D2D, communications, and controller circuitry configured in combination with the transceiver circuitry to determine that the transceiver circuitry is to transmit one or more reference signals in accordance with one or more reference signal characteristics, to transmit the reference signals to the infrastructure equipment and/or one or more of the other communications devices in accordance with the determined reference signal characteristics, and to perform measurements on the basis of signals received in response to the transmitted reference signals and/or other reference signals received from one or more of the other communications devices, wherein the performed measurements are used to update a local map associated with at least one of the communications device and the infrastructure equipment on the basis of the performed measurements, wherein the local map describes an environment of the at least one of the communications device and the infrastructure equipment.

Paragraph 34. A method of operating an infrastructure equipment forming part of a wireless communications network, the infrastructure equipment being configured to transmit signals to and/or to receive signals from a plurality of communications devices, the method comprising receiving, from each of at least one of the plurality of communications devices, one or more reference signals in accordance with one or more reference signal characteristics, and performing measurements on the basis of the received reference signals, wherein the performed measurements are used to update a local map associated with at least one of the infrastructure equipment and the plurality of communications devices on the basis of the performed measurements, wherein the local map describes an environment of the at least one of the infrastructure equipment and the plurality of communications devices.

Paragraph 35. A method according to Paragraph 34, wherein each of the received reference signals comprises an indication that the reference signal is for a Simultaneous Localization and Mapping, SLAM, process being performed by the at least one of the communications devices.

Paragraph 36. A method according to Paragraph 35, wherein the indication is implicitly indicated by a value of at least one communications parameter of the received reference signals.

Paragraph 37. A method according to any of Paragraphs 34 to 36, wherein the received reference signals are discovery signals.

Paragraph 38. A method according to any of Paragraphs 34 to 37, wherein the received reference signals are Sounding Reference Signals, SRS.

Paragraph 39. A method according to any of Paragraphs 34 to 38, wherein the received reference signals are positioning reference signals, PRS, used for positioning.

Paragraph 40. A method according to any of Paragraphs 34 to 39, wherein the received reference signals are sidelink synchronization signals, SLSS, used for synchronisation.

Paragraph 41. A method according to any of Paragraphs 34 to 40, comprising transmitting a command to at least one of the communications devices, wherein the command indicates that the at least one of the communications devices is to transmit the reference signals.

Paragraph 42. A method according to Paragraph 41, wherein the command comprises an indication of the one or more reference signal characteristics in accordance with which the reference signals are to be transmitted.

Paragraph 43. A method according to Paragraph 42, wherein the one or more reference signal characteristics are one or more of:

an indication of time radio resources within which the at least one of the communications devices is to transmit the reference signals, an indication of frequency resources within which the at least one of the communications devices is to transmit the reference signals, an indication of a periodicity with which the at least one of the communications devices is to transmit the reference signals, an indication of a starting time at which the at least one of the communications devices is to start transmitting the reference signals, an indication of an expiry time at which the at least one of the communications devices is to stop transmitting the reference signals, an indication of one or more transmission power levels with which the at least one of the communications devices is to transmit the reference signals, an indication of one or more directions in which the at least one of the communications devices is to transmit the reference signals, an indication of which of the infrastructure equipment and/or the other at least one of the communications devices the communications device is to transmit the reference signals to, and an indication of a route that the at least one of the communications devices is to follow while transmitting the reference signals.

Paragraph 44. A method according to any of Paragraphs 41 to 43, wherein the infrastructure equipment transmits the command on the basis that the local map comprises a blind spot.

Paragraph 45. A method according to any of Paragraphs 41 to 44, wherein the infrastructure equipment transmits the command on the basis that the local map has not been updated for longer than a threshold time.

Paragraph 46. A method according to any of Paragraphs 34 to 45, wherein each of the received reference signals comprises an indication of a location and/or a velocity of the at least one of the communications devices.

Paragraph 47. A method according to any of Paragraphs 34 to 46, wherein each of the received reference signals comprises an indication of at least a portion of the local map associated with the at least one of the communications devices, the at least the portion of the local map being relevant to the infrastructure equipment.

Paragraph 48. A method according to any of Paragraphs 34 to 47, comprising updating the local map associated with the infrastructure equipment on the basis of the performed measurements.

Paragraph 49. A method according to Paragraph 48, comprising transmitting at least part of the local map associated with the infrastructure equipment to at least one of the communications devices.

Paragraph 50. A method according to Paragraph 48 or Paragraph 49, wherein the local map associated with the infrastructure equipment comprises information describing locations of one or more landmarks in the environment of the infrastructure equipment.

Paragraph 51. A method according to any of Paragraphs 48 to 50, wherein the local map associated with the infrastructure equipment comprises information describing locations and/or velocities of one or more of the communications devices in the environment of the infrastructure equipment.

Paragraph 52. A method according to any of Paragraphs 48 to 51, wherein the local map associated with the infrastructure equipment comprises information describing locations and/or velocities of one or more relay nodes which are configured to relay signals between the infrastructure equipment and one or more of the communications devices.

Paragraph 53. A method according to any of Paragraphs 48 to 52, wherein the infrastructure equipment uses the local map associated with the infrastructure equipment to allocated resources to one or more of the communications devices.

Paragraph 54. A method according to any of Paragraphs 48 to 53, wherein the infrastructure equipment uses the local map associated with the infrastructure equipment to determine one or more relay nodes that are to be used by one or more of the communications devices to transmit signals to and receive signals from the infrastructure equipment.

Paragraph 55. An infrastructure equipment forming part of a wireless communications network, comprising transceiver circuitry configured to transmit signals to and/or to receive signals from a plurality of communications devices, and controller circuitry configured in combination with the transceiver circuitry to receive, from each of at least one of the plurality of communications devices, one or more reference signals in accordance with one or more reference signal characteristics, and to perform measurements on the basis of the received reference signals, wherein the performed measurements are used to update a local map associated with at least one of the infrastructure equipment and the plurality of communications devices on the basis of the performed measurements, wherein the local map describes an environment of the at least one of the infrastructure equipment and the plurality of communications devices.

Paragraph 56. Circuitry for an infrastructure equipment forming part of a wireless communications network, comprising transceiver circuitry configured to transmit signals to and/or to receive signals from a plurality of communications devices, and controller circuitry configured in combination with the transceiver circuitry to receive, from each of at least one of the plurality of communications devices, one or more reference signals in accordance with one or more reference signal characteristics, and to perform measurements on the basis of the received reference signals, wherein the performed measurements are used to update a local map associated with at least one of the infrastructure equipment and the plurality of communications devices on the basis of the performed measurements, wherein the local map describes an environment of the at least one of the infrastructure equipment and the plurality of communications devices.

Paragraph 57. A wireless telecommunications system comprising a communications device according to Paragraph 32 and an infrastructure equipment according to Paragraph 55.

Paragraph 58. A wireless telecommunications system according to Paragraph 57, further comprising one or more other communications device configured to perform Device-to-Device, D2D, communications with the communications device and/or one or more relay nodes configured to relay signals between the communications device and the infrastructure equipment.

Paragraph 59. A computer program comprising instructions which, when loaded onto a computer, cause the computer to perform a method according to any of Paragraphs 1 to 31 or Paragraphs 34 to 54.

Paragraph 60. A non-transitory computer-readable storage medium storing a computer program according to Paragraph 59.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-172834, "Revised WID on New Radio Access Technology," NTT DOCOMO, RAN #78.

[3] TS 36.300, "Evolved Universal Terrestrial Radio Access (E-UTRA) and Evolved Universal Terrestrial Radio Access Network (E-UTRAN); Overall description; Stage 2 (Release 16, v16.0.0)", 3GPP, January 2020.

"6G White Paper on Localization and Sensing" (Andre Bourdoux et al.), June 2020.

"Simultaneous Localisation and Mapping (SLAM): Part I The Essential Algorithms" (Hugh Durrant-Whyte and Tim Bailey), June 2006.

What is claimed is:

1. A method of operating a communications device for transmitting signals to and/or receiving signals from an infrastructure equipment of wireless communications network and transmitting signals to and/or receiving signals from one or more other communications devices in accordance with Device-to-Device, D2D, communications, the method comprising determining that the communications device is to transmit one or more reference signals, each comprising an indication that the reference signal is for a Simultaneous Localization and Mapping (SLAM) process being performed by the communications device, in accordance with one or more reference signal characteristics, transmitting the reference signals to the infrastructure equipment and/or one or more of the other communications devices in accordance with the determined reference signal characteristics, and performing measurements on the basis of signals received in response to the transmitted reference signals and/or other reference signals received from one or more of the other communications devices, wherein the performed measurements are used to update a local map associated with at least one of the communications device and the infrastructure equipment on the basis of the performed measurements, wherein the local map describes an environment of the at least one of the communications device and the infrastructure equipment.

2. A method according to claim 1, wherein the indication is implicitly indicated by a value of at least one communications parameter of the transmitted reference signals.

3. A method according to claim 1, wherein the transmitted reference signals are discovery signals.

4. A method according to claim 1, wherein the transmitted reference signals are Sounding Reference Signals, SRS.

5. A method according to claim 1, wherein the transmitted reference signals are positioning reference signals, PRS, used for positioning.

6. A method according to claim 1, wherein the transmitted reference signals are sidelink synchronization signals, SLSS, used for synchronisation.

7. A method according to claim 1, wherein the determining that the communications device is to transmit the reference signals comprises receiving a command from either the infrastructure equipment or a relay node configured to relay signals between the communications device and the infrastructure equipment, wherein the command indicates that the communications device is to transmit the reference signals.

8. A method according to claim 7, wherein the command comprises an indication of the one or more reference signal characteristics in accordance with which the reference signals are to be transmitted.

9. A method according to claim 8, wherein the one or more reference signal characteristics are one or more of:

an indication of time radio resources within which the communications device is to transmit the reference signals, an indication of frequency resources within which the communications device is to transmit the reference signals, an indication of a periodicity with which the communications device is to transmit the reference signals, an indication of a starting time at which the communications device is to start transmitting the reference signals, an indication of an expiry time at which the communications device is to stop transmitting the reference signals, an indication of one or more transmission power levels with which the communications device is to transmit the reference signals, an indication of one or more directions in which the communications device is to transmit the reference signals, an indication of which of the infrastructure equipment and/or the other communications devices the communications device is to transmit the reference signals to, and an indication of a route that the communications device is to follow while transmitting the reference signals.

10. A method according to claim 7, wherein the communications device receives the command on the basis that the local map comprises a blind spot.

11. A method according to claim 7, wherein the communications device receives the command on the basis that the local map has not been updated for longer than a threshold time.

12. A method according to claim 1, wherein the determining that the communications device is to transmit the reference signals comprises determining that the local map comprises a blind spot.

13. A method according to claim 1, wherein the determining that the communications device is to transmit the reference signals comprises determining that the local map has not been updated for longer than a threshold time.

14. A method according to claim 1, wherein the determining that the communications device is to transmit the reference signals comprises determining that the communications device is to transmit the reference signals in accordance with a preconfigured periodicity.

15. A method according to claim 1, wherein the determining that the communications device is to transmit the reference signals comprises determining the one or more reference signal characteristics in accordance with which the reference signals are to be transmitted on the basis of an indication of the one or more reference signal characteristics which has been previously received by the communications device.

16. A method according to claim 1, wherein each of the transmitted reference signals comprises an indication that only a specified subset of the other communications devices are to receive the reference signal and to transmit to the communications device a response to the reference signal.

17. A method according to claim 1, wherein each of the transmitted reference signals comprises an indication of a location and/or a velocity of the communications device.

18. A communications device comprising transceiver circuitry configured to transmit signals to and/or to receive signals from a wireless communications network and to transmit signals to and/or to receive signals from one or more other communications devices in accordance with Device-to-Device, D2D, communications, and controller circuitry configured in combination with the transceiver circuitry to determine that the communications device is to transmit one or more reference signals, each comprising an indication that the reference signal is for a Simultaneous Localization and Mapping (SLAM) process being performed by the communications device, in accordance with one or more reference signal characteristics, to transmit the reference signals to the wireless communications network and/or one or more of the other communications devices in accordance with the determined reference signal characteristics, and to perform measurements on the basis of signals received in response to the transmitted reference signals and/or other reference signals received from one or more of the other communications devices, wherein the performed measurements are used to update a local map associated with at least one of the communications device and the wireless communications network on the basis of the performed measurements, wherein the local map describes an environment of the at least one of the communications device and the wireless communications network.

19. An infrastructure equipment forming part of a wireless communications network, comprising transceiver circuitry configured to transmit signals to and/or to receive signals from a plurality of communications devices, and controller circuitry configured in combination with the transceiver circuitry to receive, from each of at least one of the plurality of communications devices, one or more reference signals, each comprising an indication that the reference signal is for a Simultaneous Localization and Mapping (SLAM) process being performed by the at least one of the communications devices, in accordance with one or more reference signal characteristics, and to perform measurements on the basis of the received reference signals, wherein the performed measurements are used to update a local map associated with at least one of the infrastructure equipment and the plurality of communications devices on the basis of the performed measurements, wherein the local map describes an environment of the at least one of the infrastructure equipment and the plurality of communications devices.

* * * * *